United States Patent
Kim et al.

(10) Patent No.: US 12,291,591 B2
(45) Date of Patent: May 6, 2025

(54) METHOD OF PREPARING VINYL CYANIDE COMPOUND-CONJUGATED DIENE COMPOUND-AROMATIC VINYL COMPOUND GRAFT COPOLYMER, AND THERMOPLASTIC RESIN COMPOSITION INCLUDING GRAFT COPOLYMER

(71) Applicant: LG CHEM, LTD., Seoul (KR)

(72) Inventors: Yoo Vin Kim, Daejeon (KR); Jae Min Suk, Daejeon (KR); Young Hwan Jeong, Daejeon (KR); Changhong Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1009 days.

(21) Appl. No.: 17/299,218

(22) PCT Filed: Aug. 3, 2020

(86) PCT No.: PCT/KR2020/010185
§ 371 (c)(1),
(2) Date: Jun. 2, 2021

(87) PCT Pub. No.: WO2021/033953
PCT Pub. Date: Feb. 25, 2021

(65) Prior Publication Data
US 2022/0049038 A1 Feb. 17, 2022

(30) Foreign Application Priority Data

Aug. 16, 2019 (KR) .................. 10-2019-0100526

(51) Int. Cl.
| | | |
|---|---|---|
| *C08F 279/04* | (2006.01) | |
| *C08F 2/24* | (2006.01) | |
| *C08F 6/22* | (2006.01) | |
| *C08L 55/02* | (2006.01) | |

(52) U.S. Cl.
CPC .............. *C08F 279/04* (2013.01); *C08F 2/24* (2013.01); *C08F 6/22* (2013.01); *C08L 55/02* (2013.01)

(58) Field of Classification Search
CPC .. C08F 279/04; C08F 2/24; C08F 6/22; C08F 2/38; C08F 6/18; C08L 55/02; C08L 25/12
See application file for complete search history.

(56) References Cited

U.S. PATENT DOCUMENTS 4,694,032 A * 9/1987 Kakimoto ............... C08L 51/04
524/217
2016/0083572 A1 3/2016 Niessner et al.

FOREIGN PATENT DOCUMENTS

| JP | 2006-096926 A | | 4/2006 |
|---|---|---|---|
| KR | 10-2003-0023389 A | | 3/2003 |
| KR | 10-0463482 B | | 12/2004 |
| KR | 10-2005-0021250 A | | 3/2005 |
| KR | 10-0477162 B | | 3/2005 |
| KR | 10-2006-0040016 A | | 5/2006 |
| KR | 10-2009-0052364 A | | 5/2009 |
| KR | 10-2014-0082134 A | | 7/2014 |
| KR | 10-2017-0044484 A | | 4/2017 |
| KR | 10-2018-0047749 A | | 5/2018 |
| KR | 2018-0047752 A | * | 5/2018 |
| WO | WO2008034724 A2 | | 3/2008 |

OTHER PUBLICATIONS

Extended European Search Report for related application EP 20854245.6, mailed Feb. 16, 2022.

* cited by examiner

*Primary Examiner* — K. Boyle

(57) ABSTRACT

A copolymer is prepared by graft-polymerizing 20 to 40% of an aromatic vinyl compound and 1 to 20% of a vinyl cyanide compound onto 50 to 70% of conjugated diene rubber latex having a solids content of 30 to 65% by weight, coagulating the latex by adding 0.04 to 0.27 parts by weight of a first nonionic polymer coagulant, and 0.47 to 1.65 parts by weight of a second cationic polymer coagulant or 0.73 to 3.35 parts by weight of a second anionic polymer coagulant to 100 parts by weight (based on solids) of the prepared graft copolymer latex. When the second coagulant is the cationic polymer coagulant, the total weight of coagulant is 0.7 to 1.7 parts by weight, and when the second coagulant is the anionic polymer coagulant, the total weight of coagulant is 0.97 to 3.37 parts by weight.

13 Claims, No Drawings

METHOD OF PREPARING VINYL CYANIDE COMPOUND-CONJUGATED DIENE COMPOUND-AROMATIC VINYL COMPOUND GRAFT COPOLYMER, AND THERMOPLASTIC RESIN COMPOSITION INCLUDING GRAFT COPOLYMER

TECHNICAL FIELD

Cross-Reference to Related Application

This application is a National Phase of International Application No. PCT/KR2020/010185 which claims priority to Korean Patent Application No. 10-2019-0100526, filed on Aug. 16, 2019 in the Korean Intellectual Property Office, the disclosures of which are incorporated herein by reference.

The present invention relates to a method of preparing a graft copolymer and a thermoplastic resin composition including the same. According to the present invention, a nonionic polymer coagulant and a cationic polymer coagulant, or a nonionic polymer coagulant and an anionic polymer coagulant are mixed and added to graft copolymer latex prepared by graft-polymerizing an aromatic vinyl compound and a vinyl cyanide compound onto conjugated diene rubber latex to coagulate and age the graft copolymer latex. Accordingly, coagulation efficiency may be improved, and a graft copolymer having excellent gloss, color properties, and processability and a thermoplastic resin composition including the graft copolymer may be provided.

BACKGROUND ART

Acrylonitrile-butadiene-styrene copolymers (hereinafter referred to as "ABS copolymers") represented by vinyl cyanide compound-conjugated diene compound-aromatic vinyl compound graft copolymers have good physical properties, such as impact resistance, mechanical strength, moldability, and gloss, and thus are widely used in various fields such as electric parts, electronic parts, office equipment, and automobile parts.

In general, compared to ABS copolymers prepared using bulk polymerization, ABS copolymers prepared by grafting aromatic vinyl compound monomers and vinyl cyanide compound monomers onto conjugated diene rubber latex using emulsion polymerization exhibit a good balance in physical properties and have excellent gloss. Thus, emulsion polymerization is mainly used to prepare ABS copolymers.

In addition, for reduction in volume, improvement in applicability, and ease of handling, ABS copolymer latex prepared using emulsion polymerization is preferably formed in a powder form. According to a conventional method, ABS resin powder may be obtained by coagulating, aging, dehydrating, and drying ABS resin latex.

When coagulation of ABS copolymer latex prepared using emulsion polymerization is performed, various coagulants may be used to chemically coagulate latex particles stabilized by an emulsifier used in emulsion polymerization. In this case, an acid or a metal salt may be used as the coagulant. When an acid is used to coagulate latex, the residual amount of the acid may lower the thermal stability of an ABS resin, and the amount of gas generated during a thermoforming process may be increased, thereby increasing the yellowness index of the resin. In addition, when a metal salt is used to coagulate latex, the amount of gas generated and yellowness index are relatively low, but productivity may be reduced.

Therefore, there is a need to develop an ABS copolymer preparation method that allows efficient coagulation of ABS copolymer latex and preparation of an ABS copolymer having excellent color properties.

RELATED ART DOCUMENTS

Patent Documents (Patent Document 1) KR 10-0463482 B1

DISCLOSURE

Technical Problem

Therefore, the present invention has been made in view of the above problems, and it is one object of the present invention to provide a method of preparing a graft copolymer, the method including a step of preparing graft copolymer latex by graft-polymerizing 20 to 40% by weight of an aromatic vinyl compound and 1 to 20% by weight of a vinyl cyanide compound onto 50 to 70% by weight of conjugated diene rubber latex having a solids content of 30 to 65% by weight; and a step of coagulating and aging the prepared graft copolymer latex by adding 0.04 to 0.27 parts by weight of a nonionic polymer coagulant as a first coagulant, and 0.47 to 1.65 parts by weight of a cationic polymer coagulant or 0.73 to 3.35 parts by weight of an anionic polymer coagulant as a second coagulant to 100 parts by weight (based on solids) of the prepared graft copolymer latex, wherein, when the second coagulant is the cationic polymer coagulant, the total weight of the nonionic polymer coagulant and the cationic polymer coagulant is 0.7 to 1.7 parts by weight, and when the second coagulant is the anionic polymer coagulant, the total weight of the nonionic polymer coagulant and the anionic polymer coagulant is 0.97 to 3.37 parts by weight, and a thermoplastic resin composition including the graft copolymer. According to the present invention, a graft copolymer prepared using the method of the present invention has good coagulation efficiency and excellent gloss. In addition, since a b-value measured using a Hunter lab colorimeter and a b-value measured after being left at 250° C. for 15 minutes are small, the graft copolymer has excellent color properties.

The above and other objects can be accomplished by the present disclosure described below.

Technical Solution

In accordance with one aspect of the present invention, provided is a method of preparing a vinyl cyanide compound-conjugated diene compound-aromatic vinyl compound graft copolymer, the method including preparing graft copolymer latex by graft-polymerizing 20 to 40% by weight of an aromatic vinyl compound and 1 to 20% by weight of a vinyl cyanide compound onto 50 to 70% by weight of conjugated diene rubber latex having a solids content of 30 to 65% by weight; and coagulating and aging the prepared graft copolymer latex by adding 0.04 to 0.27 parts by weight of a nonionic polymer coagulant as a first coagulant, and 0.47 to 1.65 parts by weight of a cationic polymer coagulant or 0.73 to 3.35 parts by weight of an anionic polymer coagulant as a second coagulant to 100 parts by weight (based on solids) of the prepared graft copolymer latex, wherein, when the second coagulant is the cationic polymer coagulant, a total weight of the nonionic polymer coagulant and the cationic polymer coagulant is 0.7 to 1.7 parts by weight, and when the second coagulant is the anionic polymer coagulant, a total weight of the nonionic polymer coagulant and the anionic polymer coagulant is 0.97 to 3.37 parts by weight.

In accordance with another aspect of the present invention, provided is a vinyl cyanide compound-conjugated diene compound-aromatic vinyl compound graft copolymer prepared using the method of the present invention.

In accordance with yet another aspect of the present invention, provided is a thermoplastic resin composition including 20 to 40% by weight of the vinyl cyanide compound-conjugated diene compound-aromatic vinyl compound graft copolymer and 60 to 80% by weight of an aromatic vinyl compound-vinyl cyanide compound copolymer.

Advantageous Effects

According to the present invention, graft copolymer latex prepared by graft-polymerizing an aromatic vinyl compound and a vinyl cyanide compound onto conjugated diene rubber latex is coagulated and aged using a nonionic polymer coagulant and a cationic polymer coagulant, or a nonionic polymer coagulant and an anionic polymer coagulant. Accordingly, coagulation efficiency can be improved, a b-value measured using a Hunter lab colorimeter and a b-value measured after being left are small, and gloss can be improved, which makes it possible to realize an aesthetically pleasing color.

BEST MODE

The present inventors confirmed that, when vinyl cyanide compound-conjugated diene compound-aromatic vinyl compound graft copolymer latex was coagulated using a nonionic polymer coagulant and a cationic polymer coagulant, or using a nonionic polymer coagulant and an anionic polymer coagulant, and when the polymer coagulants were used in specific amounts, gloss increased, and a b-value measured using a Hunter lab colorimeter and a b-value measured after being left at 250° C. for 15 minutes (hereinafter referred to as "b-value measured after being left") were low, indicating excellent color properties. Based on these findings, the present inventors conducted further study to complete the present invention.

Hereinafter, a method of preparing a vinyl cyanide compound-conjugated diene compound-aromatic vinyl compound graft copolymer according to the present invention will be described in detail.

The method of preparing a vinyl cyanide compound-conjugated diene compound-aromatic vinyl compound graft copolymer of the present invention includes a step of preparing graft copolymer latex by graft-polymerizing 20 to 40% by weight of an aromatic vinyl compound and 1 to 20% by weight of a vinyl cyanide compound onto 50 to 70% by weight of conjugated diene rubber latex having a solids content of 30 to 65% by weight; and a step of coagulating the prepared graft copolymer latex by adding 0.04 to 0.27 parts by weight of a nonionic polymer coagulant as a first coagulant, and 0.47 to 1.65 parts by weight of a cationic polymer coagulant or 0.73 to 3.35 parts by weight of an anionic polymer coagulant as a second coagulant to 100 parts by weight (based on solids) of the prepared graft copolymer latex. In this case, when the second coagulant is the cationic polymer coagulant, the total weight of the nonionic polymer coagulant and the cationic polymer coagulant is 0.7 to 1.7 parts by weight, and when the second coagulant is the anionic polymer coagulant, the total weight of the nonionic polymer coagulant and the anionic polymer coagulant is 0.97 to 3.37 parts by weight. In this case, coagulation efficiency may be excellent. In addition, a b-value measured using a Hunter lab colorimeter and a b-value measured after being left may be small, and high gloss may be realized, thereby realizing excellent color properties.

The preparation method of the present invention will be described in detail stepwise.

Step of Preparing Conjugated Diene Rubber Latex

For example, a method of preparing conjugated diene rubber latex may include a step of preparing conjugated diene rubber latex by adding 30 to 100 parts by weight of deionized water, 0.5 to 3 parts by weight of an emulsifier, 0.01 to 0.5 parts by weight of an electrolyte, 0.1 to 0.5 parts by weight of a molecular weight modifier, and 0.1 to 1 part by weight of an initiator to 100 parts by weight of a conjugated diene compound and performing polymerization. In this case, impact resistance may be excellent.

As another example, the method of preparing conjugated diene rubber latex may include a step of preparing conjugated diene rubber latex by adding 40 to 70 parts by weight of deionized water, 1 to 2.5 parts by weight of an emulsifier, 0.05 to 0.3 parts by weight of an electrolyte, 0.2 to 0.4 parts by weight of a molecular weight modifier, and 0.3 to 0.8 parts by weight of an initiator to 100 parts by weight of a conjugated diene compound and performing polymerization. In this case, impact resistance may be excellent.

As a specific example, the method of preparing conjugated diene rubber latex may include a first polymerization step of adding 30 to 100 parts by weight of deionized water, 0.3 to 2 parts by weight of an emulsifier, 0.01 to 0.5 parts by weight of an electrolyte, 0.1 to 0.5 parts by weight of a molecular weight modifier, and 0.05 to 0.5 parts by weight of an initiator to 75 to 90 parts by weight of 100 parts by weight of a conjugated diene compound and performing polymerization; a second polymerization step of, when a polymerization conversion rate reaches 35 to 45% after the first polymerization step, adding 0.05 to 0.5 parts by weight of an initiator, continuously feeding 10 to 25 parts by weight of the conjugated diene compound, and performing polymerization; a third polymerization step of, when a polymerization conversion rate reaches 70 to 80% after the second polymerization, adding 0.2 to 1 part by weight of an emulsifier and performing polymerization; and a step of terminating polymerization when a polymerization conversion rate reaches 93 to 99% after the third polymerization. In this case, impact resistance may be excellent.

In the present invention, the polymerization conversion rate may be defined as the weight percentage of a monomer converted into a polymer based on 100% by weight in total of the monomer added until the end of polymerization. Any polymerization conversion rate measurement method performed according to this definition may be used as the polymerization conversion rate measurement method of the present invention without limitation. As a specific example, 1.5 g of prepared latex is dried for 15 minutes in a hot air dryer at 150° C., the weight thereof is measured, total solids content (TSC) thereof is calculated using Equation 1 below, and a polymerization conversion rate is calculated by substituting the total solids content into Equation 2 below. In Equation 2, the total weight of monomers added is set to 100 parts by weight.

Total solids content (TSC,%)=(Weight after drying/weight before drying)×100    [Equation 1]

Polymerization conversion rate (%)=[Total solids
content (TSC)×(Total weight of a monomer,
deionized water, and subsidiary raw materials,
which are added)/100]−(Weight of added sub-
sidiary raw materials except for a monomer and
deionized water)                                       [Equation 2]

In Equation 2, the subsidiary raw materials include initiators, emulsifiers, electrolytes, and molecular weight modifiers.

The added monomer refers to a conjugated diene compound.

For example, the conjugated diene compound may include one or more selected from the group consisting of 1,3-butadiene, 2,3-dimethyl-1,3-butadiene, 2-ethyl-1,3-butadiene, 1,3-pentadiene, and isoprene.

For example, the emulsifier may include one or more selected from the group consisting of rosin acid metal salts, alkyl aryl sulfonates, alkali metal alkyl sulfates, sulfonated alkyl esters, and metal salts of unsaturated fatty acids.

For example, the electrolyte may include one or more selected from the group consisting of $KCl$, $NaCl$, $KHCO_3$, $NaHCO_3$, $K_2CO_3$, $Na_2CO_3$, $KHSO_3$, $NaHSO_3$, $K_4P_2O_7$, $Na_4P_2O_7$, $K_3PO_4$, $Na_3PO_4$, $K_2HPO_4$, and $Na_2HPO_4$.

For example, water-soluble persulfate polymerization initiators, fat-soluble polymerization initiators, redox system catalysts, and the like may be used as the initiator. For example, the water-soluble persulfate polymerization initiators may include one or more selected from the group consisting of potassium persulfate, sodium persulfate, and ammonium persulfate; the fat-soluble polymerization initiators may include one or more selected from the group consisting of cumene hydroperoxide, diisopropyl benzene hydroperoxide, azobisisobutyronitrile, t-butyl hydroperoxide, paramenthane hydroperoxide, and benzoyl peroxide; and the redox system catalysts may include one or more selected from the group consisting of sodium formaldehyde sulfoxylate, sodium ethylenediaminetetraacetate, ferrous sulfate, dextrose, sodium pyrophosphate, and sodium sulfite.

Most preferably, when the conjugated diene rubber latex is prepared, potassium persulfate is used as the initiator.

For example, mercaptan-based molecular weight modifiers may be used as the molecular weight modifier. Preferably, tertiary dodecyl mercaptan is used as the molecular weight modifier.

For example, the conjugated diene rubber latex of the present invention may have an average particle diameter of 1,800 to 5,000 Å, preferably 2,000 to 4,000 Å, more preferably 2,500 to 3,500 Å. Within this range, impact resistance may be excellent.

In the present invention, a sample for measuring average particle diameter may be prepared by diluting conjugated diene rubber latex so that the conjugated diene rubber latex has a total solids content (TSC) of 1% or less, and the average particle diameter of the sample may be measured using Nicomp™ 380 instrument (PSS-Nicomp Co., USA) according to a dynamic laser light scattering method.

Step of Preparing Graft Copolymer Latex

For example, in the step of preparing the graft copolymer latex, 20 to 40% by weight of an aromatic vinyl compound and 1 to 20% by weight of a vinyl cyanide compound may be graft-polymerized onto 50 to 70% by weight of conjugated diene rubber latex having a solids content of 30 to 65% by weight. Preferably, 25 to 35% by weight of an aromatic vinyl compound and 5 to 15% by weight of a vinyl cyanide compound are graft-polymerized onto 55 to 65% by weight of conjugated diene rubber latex having a solids content of 30 to 65% by weight. Within this range, impact resistance, mechanical strength, and moldability may be excellent.

In the present invention, solids content is defined as the amount of active ingredients remaining when all moisture present in latex is evaporated. When solids content is measured, latex is placed on an aluminum dish, 2.5 g of latex is prepared using a scale, and the prepared latex is held at 150° C. for 5 minutes so that all moisture in the latex is evaporated. Then, the weight of the latex powder is measured, and the measured value is substituted into Equation 3 to calculate the solids content of the latex.

Solids content (% by weight)=100−[(Weight of latex
before evaporating moisture (g)−weight of pow-
der remaining after evaporating moisture (g))/
weight of latex before evaporating moisture
(g)×100]                                                 [Equation 3]

For example, in the step of preparing the graft copolymer latex, 70 to 200 parts by weight of deionized water, 0.1 to 2 parts by weight of an initiator, 0.1 to 2 parts by weight of an emulsifier, and 0.05 to 1.5 parts by weight of a molecular weight modifier may be added to 100 parts by weight in total of the conjugated diene rubber latex, the aromatic vinyl compound, and the vinyl cyanide compound to perform polymerization, and then the polymerization reaction may be terminated at a polymerization conversion rate of 93 to 99% by weight.

In this step, the polymerization conversion rate is defined to be the same as the polymerization conversion rate described in the step of preparing the conjugated diene rubber latex, and is measured using the same measurement method as the step of preparing the conjugated diene rubber latex. The added monomers are a conjugated diene compound, an aromatic vinyl compound, and a vinyl cyanide compound included in rubber latex.

As another example, in the step of preparing the graft copolymer latex, 100 to 170 parts by weight of deionized water, 0.3 to 1 part by weight of an initiator, 0.5 to 1.5 parts by weight of an emulsifier, and 0.1 to 1.0 part by weight of a molecular weight modifier may be added to 100 parts by weight in total of the conjugated diene rubber latex, the aromatic vinyl compound, and the vinyl cyanide compound to perform polymerization, and then the polymerization reaction may be terminated at a polymerization conversion rate of 95 to 98% by weight.

As a specific example, in the step of preparing the graft copolymer latex, based on 100 parts by weight in total of conjugated diene rubber, an aromatic vinyl compound, and a vinyl cyanide compound, a mixed solution containing 20 to 40% by weight of an aromatic vinyl compound, 1 to 20% by weight of a vinyl cyanide compound, 10 to 50 parts by weight of deionized water, 0.09 to 1.5 parts by weight of an initiator, 0.1 to 2 parts by weight of an emulsifier, and 0.05 to 1.5 parts by weight of a molecular weight modifier, which are mixed in a separate mixing apparatus, is added to 50 to 70% by weight of conjugated diene rubber latex having a solids content of 30 to 65% by weight and 60 to 150 parts by weight of deionized water at 65 to 75° C. for 2 to 4 hours; 0.01 to 0.5 parts by weight of an initiator is added thereto; heating is performed so that temperature is increased to 75 to 80° C. over 30 to 90 minutes; and graft polymerization is terminated when a polymerization conversion rate reaches 93 to 99% by weight. In this case, impact resistance, mechanical strength, and moldability may be excellent.

For example, the vinyl cyanide compound may be acrylonitrile, methacrylonitrile, or a mixture thereof.

For example, the aromatic vinyl compound may include one or more selected from the group consisting of styrene, α-methyl styrene, o-methyl styrene, ρ-methyl styrene, m-methyl styrene, ethyl styrene, isobutyl styrene, t-butyl styrene, o-bromo styrene, ρ-bromo styrene, m-bromo styrene, o-chloro styrene, ρ-chloro styrene, m-chloro styrene, vinyltoluene, vinylxylene, fluorostyrene, and vinylnaphthalene.

For example, the emulsifier, the initiator, and the molecular weight modifier may be used in amounts within the ranges described in the step of preparing the conjugated diene rubber latex.

According to the present invention, other additives such as electrolytes that are not specifically mentioned in the present invention may be appropriately selected as necessary, and additives commonly used in the preparation of vinyl cyanide compound-conjugated diene compound-aromatic vinyl compound graft copolymer latex may be used without particular limitation.

In addition to the above-described reaction conditions, other reaction conditions, such as reaction time, reaction temperature, pressure, and timing of addition of reactants, commonly used in the art to which the present invention pertains may be appropriately selected and used as necessary, without particular limitation.

Coagulating and Aging Graft Copolymer Latex

The prepared graft copolymer latex is coagulated and aged using coagulants to form a graft copolymer slurry.

For example, the step of coagulating and aging may include a step of coagulating the prepared graft copolymer latex by adding 0.04 to 0.27 parts by weight of a nonionic polymer coagulant as a first coagulant, and 0.47 to 1.65 parts by weight of a cationic polymer coagulant or 0.73 to 3.35 parts by weight of an anionic polymer coagulant as a second coagulant to 100 parts by weight (based on solids) of the prepared graft copolymer latex. In this case, when the second coagulant is the cationic polymer coagulant, the total weight of the nonionic polymer coagulant and the cationic polymer coagulant may be 0.7 to 1.7 parts by weight, and when the second coagulant is the anionic polymer coagulant, the total weight of the nonionic polymer coagulant and the anionic polymer coagulant may be 0.97 to 3.37 parts by weight. In this case, coagulation efficiency may be improved, high gloss may be realized, and a b-value measured using a Hunter lab colorimeter and a b-value measured after being left may be small, thereby realizing an aesthetically pleasing color.

For example, the step of coagulating and aging may be a step of performing coagulation and aging by adding the first polymer coagulant and the second polymer coagulant to the graft copolymer latex at 75 to 90° C., preferably a step of performing coagulation and aging by adding the first polymer coagulant and the second polymer coagulant to the graft copolymer latex at 78 to 82° C. In this case, uniform coagulation is possible, and coagulation efficiency may be excellent.

For example, the step of coagulating and aging may be performed for 5 to 100 minutes, preferably 20 to 80 minutes, more preferably 30 to 60 minutes, after adding the first and second polymer coagulants to the graft copolymer latex. In this case, uniform coagulation is possible, and coagulation efficiency may be excellent.

For example, the step of coagulating and aging may be performed at a stirring speed of 5 to 450 rpm or 10 to 400 rpm, preferably 30 to 300 rpm, more preferably 30 to 100 rpm, without being limited thereto. Within this range, productivity and coagulation efficiency may be improved, and physical property balance may be excellent.

For example, the nonionic polymer coagulant as the first coagulant may be included in an amount of 0.04 to 0.27 parts by weight, preferably 0.05 to 0.25 parts by weight. Within this range, coagulation efficiency may be improved, high gloss may be realized, and a b-value measured using a Hunter lab colorimeter and a b-value measured after being left may be small, thereby realizing an aesthetically pleasing color.

For example, the cationic polymer coagulant as the second coagulant may be included in an amount of 0.47 to 1.65 parts by weight, preferably 0.5 to 1.6 parts by weight, more preferably 0.1 to 1.0 part by weight. In this case, coagulation efficiency may be improved, high gloss may be realized, and a b-value measured using a Hunter lab colorimeter and a b-value measured after being left may be small, thereby realizing an aesthetically pleasing color.

For example, the anionic polymer coagulant as the second coagulant may be included in an amount of 0.73 to 3.35 parts by weight, preferably 0.75 to 3.3 parts by weight, more preferably 0.75 to 1.5 parts by weight. In this case, coagulation efficiency may be improved, high gloss may be realized, and a b-value measured using a Hunter lab colorimeter and a b-value measured after being left may be small, thereby realizing an aesthetically pleasing color.

For example, when the second coagulant is the cationic polymer coagulant, the total weight of the nonionic polymer coagulant and the cationic polymer coagulant may be 0.7 to 1.7 parts by weight, preferably 0.75 to 1.65 parts by weight, more preferably 0.75 to 1.2 parts by weight. Within this range, coagulation efficiency may be improved, high gloss may be realized, and a b-value measured using a Hunter lab colorimeter and a b-value measured after being left may be small, thereby realizing an aesthetically pleasing color.

For example, when the second coagulant is the anionic polymer coagulant, the total weight of the nonionic polymer coagulant and the anionic polymer coagulant may be 0.97 to 3.37 parts by weight, preferably 1.0 to 3.35 parts by weight, more preferably 1.0 to 2.0 parts by weight. Within this range, coagulation efficiency may be improved, high gloss may be realized, and a b-value measured using a Hunter lab colorimeter and a b-value measured after being left may be small, thereby realizing an aesthetically pleasing color.

For example, the cationic polymer coagulant may include an amino group, an ammonium group, or both at the terminus thereof, and the anionic polymer coagulant may include an amide group, a carboxylate group, or both at the terminus thereof. In this case, coagulation efficiency may be improved, high gloss may be realized, and a b-value measured after being left, which is measured using a Hunter lab colorimeter, may be small, thereby realizing an aesthetically pleasing color.

As a specific example, the cationic polymer coagulant may include one or more selected from the group consisting of methacrylate-based polymer coagulants, ammonium acrylate-based polymer coagulants, and ammonium acrylamide-based polymer coagulants. In this case, high gloss may be realized, and a b-value measured using a Hunter lab colorimeter and a b-value measured after being left may be small, thereby realizing an aesthetically pleasing color.

For example, the cationic polymer coagulant may have a molecular weight of 0.01 to $10 \times 10^6$ Da, preferably 1 to $10 \times 10^6$ Da. Within this range, coagulation efficiency may be improved.

For example, the cationic polymer coagulant may have a pH value of 0 to 5, preferably 1 to 4 in a 0.25 mass % solution. Within this range, coagulation efficiency may be improved.

As a specific example, the cationic polymer coagulant may be a cationic polymer coagulant having a viscosity of 100 to 5,000 cps and a molecular weight of 0.01 to $10 \times 10^6$ Da in a 1 mass % stock solution and having a pH value of 2 to 4 in a 0.1 mass % solution; a cationic polymer coagulant having a molecular weight of 0.01 to $10 \times 10^6$ Da and a pH value of 0 to 5 in a 0.25 mass % solution; or a mixture thereof. In this case, high gloss may be realized, and a b-value measured using a Hunter lab colorimeter and a b-value measured after being left may be small, thereby realizing an aesthetically pleasing color.

For example, the anionic polymer coagulant may have a molecular weight of 0.01 to $15 \times 10^6$ Da, preferably 1 to $15 \times 10^6$ Da. Within this range, coagulation efficiency may be improved.

For example, the anionic polymer coagulant may have a pH value of 4 to 11, preferably 5 to 10, in a 0.25 mass % solution. Within this range, coagulation efficiency may be improved.

As a specific example, the anionic polymer coagulant may be an anionic polymer coagulant having a viscosity of 1,000 to 10,000 cps and a molecular weight of 0.05 to $15 \times 10^6$ Da in a 1 mass % stock solution and having a pH value of 5 to 9 in a 0.1 mass % solution; an anionic polymer coagulant having a molecular weight of 0.01 to $15 \times 10^6$ Da and having a pH value of 5 to 10 in a 0.25 mass % solution; or a mixture thereof. In this case, high gloss may be realized, and a b-value measured using a Hunter lab colorimeter and a b-value measured after being left may be small, thereby realizing an aesthetically pleasing color.

For example, the nonionic polymer coagulant may include one or more selected from the group consisting of acrylamide-based polymer coagulants, ethylene oxide-based polymer coagulants, and propylene oxide-based polymer coagulants. In this case, high gloss may be realized, and a b-value measured using a Hunter lab colorimeter and a b-value measured after being left may be small, thereby realizing an aesthetically pleasing color.

For example, the nonionic polymer coagulant may have a molecular weight of 0.05 to $10 \times 10^6$ Da, preferably 5 to $10 \times 10^6$ Da. Within this range, coagulation efficiency may be improved.

For example, the nonionic polymer coagulant may have a pH value of 4 to 7.5, preferably 5 to 7, in a 0.25 mass % solution or may have a pH value of 3 to 8, preferably to 7.5, in a 0.1 mass % solution. Within this range, coagulation efficiency may be improved.

As a specific example, the nonionic polymer coagulant may be a nonionic polymer coagulant having a viscosity of 100 to 4,000 cps and a molecular weight of 0.05 to $10 \times 10^6$ Da in a 1 mass % stock solution and having a pH value of 4 to 7.5 in a 0.1 mass % solution; a nonionic polymer coagulant having a molecular weight of 0.05 to $10 \times 10^6$ Da and having a pH value of 5 to 7 in a 0.25 mass % solution; or a mixture thereof. In this case, high gloss may be realized, and a b-value measured using a Hunter lab colorimeter and a b-value measured after being left may be small, thereby realizing an aesthetically pleasing color.

In the present invention, unless otherwise specified, viscosity may be measured using a Brookfield viscometer at room temperature (20 to 25° C.).

In the present invention, unless otherwise specified, molecular weight may be measured by gel permeation chromatography (GPC).

In the present invention, unless otherwise specified, pH may be measured at room temperature (20 to 25° C.) using a common pH meter, as a specific example, a Thermo Scientific Orion Star A Series meter.

For example, the polymer coagulant may be prepared in the form of an emulsion. As a specific example, the polymer coagulant may include 1 to 20% by weight of an emulsifier having a solids content of 0.1 to 10% by weight, 0.1 to 10% by weight of a dispersion stabilizer, and 75 to 95% by weight of water. In this case, dispersion may be facilitated.

For example, the polymer coagulant may have a solids content of 0.1 to 10% by weight, preferably 1 to 8% by weight, more preferably 3 to 7% by weight. In this case, dispersion may be facilitated.

In the present invention, emulsion refers to a state in which two liquids that are not mixed with each other coexist at a certain ratio, and is characterized in that one liquid is dispersed in the form of droplets in the other liquid.

In the present invention, when the polymer coagulant includes a solvent such as water, the weight thereof means the weight of solids excluding the solvent.

For example, in the step of coagulating and aging, an antioxidant, a stabilizer, or a mixture thereof may be further included. In this case, after extrusion, physical property balance may be excellent.

For example, the graft copolymer latex coagulated after the step of coagulating and aging may be subjected to dehydration and drying to obtain graft copolymer powder.

In the present invention, powder means an object consisting of a plurality of solid particles. For example, powder may be an object consisting of a plurality of solid particles having an average particle diameter of 1 to 10,000 μm or 10 to 2,000 μm.

In the present invention, the average particle diameter of powder may be measured using a DP caking test. Specifically, according to the DP caking test, 10 g of powder is compressed for 10 minutes using a 20 kg weight, meshes from a #8 mesh (2,380 μm) to a #625 mesh (20 μm) are laminated in a sieve vibrator (Analysette 3, Fritsch Co., Germany), a stainless steel container for collecting powder that passes through the #625 mesh is placed at the bottom of the #625 mesh, vibration is applied to the sieve vibrator for 20 minutes, and the particle size distribution of powder remaining in the mesh is confirmed. In the particle size distribution, the diameter of particles having a cumulative weight of 50% by weight is used as the average particle diameter of the powder.

Dehydration and drying methods commonly used in the art may be used in the present invention without particular limitation.

For example, slurry obtained after coagulation may be dehydrated using a centrifugal dehydrator, a press type dehydrator, or the like to obtain a graft copolymer in a wet powder form.

For example, dehydration may be performed at least once, preferably 1 to 3 times, more preferably 2 to 3 times. In this case, the content of residual emulsifier may be reduced, thereby improving surface properties such as gloss.

For example, the graft copolymer in a wet powder form obtained after dehydration may have a moisture content of 40% by weight or less, preferably 10 to 40% by weight, more preferably 10 to 35% by weight or 10 to 30% by weight. In this case, in a drying step, which is a subsequent process, efficiency may be increased, thereby increasing productivity.

In the present invention, moisture content may be measured using a moisture analyzer. As a specific example, a moisture analyzer (Mettler Toledo Co., Switzerland) may be used.

Drying processes conventionally practiced in the art to which the present invention pertains may be used in the present invention without particular limitation. For example, a graft copolymer in a wet powder form may be dried by air supplied from a fluidized bed dryer to obtain graft copolymer powder.

In addition, graft copolymer powder obtained by drying a graft copolymer in a wet powder form may have a moisture content of, e.g., 2% by weight or less, preferably 0.1 to 2% by weight, more preferably 0.1 to 1% by weight. Within this range, the productivity of a copolymer may be improved, and physical properties such as mechanical strength, heat resistance, and surface gloss may be excellent.

In the present invention, moisture content may be measured using a moisture analyzer. As a specific example, a moisture analyzer (Mettler Toledo Co., Switzerland) may be used.

For example, the graft copolymer powder and an aromatic vinyl compound-vinyl cyanide compound copolymer may be melt kneaded and extruded. In this case, impact resistance, chemical resistance, moldability, and gloss may be excellent. In addition, since a b-value measured using a Hunter lab colorimeter and a b-value measured after being left at 250° C. for 15 minutes are small, a thermoplastic resin composition having an aesthetically pleasing color may be prepared.

For example, the melt kneading and extruding steps may be performed at 220 to 240° C. and at 250 to 400 rpm, preferably at 225 to 235° C. and at 300 to 400 rpm, without being limited thereto.

For example, melt kneading may be performed using a Banbury mixer, a single-screw extruder, a twin-screw extruder, a kneader, or the like, without being limited thereto.

For example, when melt kneading is performed, one or more additives selected from the group consisting of colorants, heat stabilizers, light stabilizers, reinforcing agents, fillers, flame retardants, lubricants, plasticizers, antistatic agents, and processing aids may be added in an amount of 0.1 to 10 parts by weight or 0.1 to 5 parts by weight.

In addition, the vinyl cyanide compound-conjugated diene compound-aromatic vinyl compound graft copolymer of the present invention is prepared by the above-described preparation method. In this case, since a b-value measured using a Hunter lab colorimeter and a b-value measured after being left at 250° C. for 15 minutes are small and gloss increases, color properties may be excellent.

In addition, the thermoplastic resin composition of the present invention includes the vinyl cyanide compound-conjugated diene compound-aromatic vinyl compound graft copolymer in an amount of 20 to 40% by weight, preferably 25 to 35% by weight, and an aromatic vinyl compound-vinyl cyanide compound copolymer in an amount of 60 to 80% by weight, preferably 65 to 75% by weight. In this case, coagulation efficiency may be excellent, and a b-value measured using a Hunter lab colorimeter and a b-value measured after being left at 250° C. for 15 minutes are small, thereby realizing an aesthetically pleasing color.

For example, when gloss is measured at 45° using a glossmeter according to ASTM D258, the thermoplastic resin composition may have a gloss of 80 or more, preferably 80 to 100, more preferably 80 to 93. Within this range, physical property balance and color properties may be excellent.

For example, the thermoplastic resin composition may have a b-value of 4.9 or less, preferably 4.0 to 4.9, more preferably 4.6 to 4.9, as measured using a Hunter lab colorimeter. Within this range, physical property balance and color properties may be excellent.

For example, the thermoplastic resin composition may have a b-value of 8.3 or less, preferably 7.0 to 8.3, more preferably 8.1 to 8.3, as measured using a Hunter lab colorimeter after being left at 250° C. for 15 minutes. Within this range, physical property balance and color properties may be excellent.

For example, when 0.3 g of the thermoplastic resin composition is dissolved in chloroform, polymers are precipitated using methanol, supernatant is filtered, and the content of polymer coagulants is measured using LC/DAD Agilent 1290 LC-2 detectors (DAD and FLD as stand-alone instrument), the content of the polymer coagulants in the thermoplastic resin composition may be 4,000 ppm or less, preferably 100 to 4,000 ppm, more preferably 500 to 3,500 ppm. Within this range, gloss may be excellent.

In addition, a molded article of the present invention is manufactured using the thermoplastic resin composition. In this case, impact resistance, chemical resistance, moldability, and gloss may be excellent, and a b-value measured using a Hunter lab colorimeter and a b-value measured after being left at 250° C. for 15 minutes may be small, thereby realizing an aesthetically pleasing color.

In addition, the vinyl cyanide compound-conjugated diene compound-aromatic vinyl compound graft copolymer of the present invention is a vinyl cyanide compound-conjugated diene compound-aromatic vinyl compound graft copolymer prepared by graft-polymerizing 20 to 40% by weight of an aromatic vinyl compound and 1 to 20% by weight of a vinyl cyanide compound onto 50 to 70% by weight of conjugated diene rubber latex having a solids content of 30 to 65% by weight. When 0.3 g of the graft copolymer is dissolved in chloroform, polymers are precipitated using methanol, supernatant is filtered, and the content of polymer coagulants is measured using LC/DAD Agilent 1290 LC-2 detectors (DAD and FLD as stand-alone instrument), the content of polymer coagulants in the graft copolymer is 10 to 15,000 ppm. In this case, a b-value measured using a Hunter lab colorimeter and a b-value measured after being left may be small, and high gloss may be realized, thereby realizing excellent color properties.

For example, in the vinyl cyanide compound-conjugated diene compound-aromatic vinyl compound graft copolymer, the content of the polymer coagulants may be 10 to 15,000 ppm, preferably 300 to 13,000 ppm, more preferably 1,000 to 13,000 ppm. Within this range, a b-value measured using a Hunter lab colorimeter and a b-value measured after being left may be small, and gloss may increase, thereby realizing excellent color properties.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Cationic polymer coagulant: HCP-800 (HANSOL CHEMICAL Co.) having a molecular weight of 1 to $10 \times 10^6$ Da and a pH value of 0 to 5 in a 0.25 mass % solution Anionic polymer coagulant: HAP-606 (HANSOL CHEMICAL Co.) having a molecular weight of 1 to $15 \times 10^6$ Da and a pH value of 5 to 10 in a 0.25 mass % solution Nonionic polymer coagulant: HNP-910 (HANSOL CHEMICAL Co.) having a molecular weight of 5 to $10 \times 10^6$ Da and a pH value of 5 to 7 in a 0.25 mass % solution <Preparation of Conjugated Diene Rubber Latex>

55 parts by weight of deionized water, 85 parts by weight of 100 parts by weight of 1,3-butadiene as a monomer, 1.5 parts by weight of a C16 to C18 fatty acid metal salt as an emulsifier, 0.15 parts by weight of potassium carbonate ($K_2CO_3$) as an electrolyte, 0.3 parts by weight of tertiary dodecyl mercaptan (TDDM) as a molecular weight modifier, and 0.3 parts by weight of potassium persulfate as an initiator were added to a nitrogen-substituted polymerization reactor batchwise, and polymerization was performed at 70° C. When a polymerization conversion rate reached 35 to 45%, 0.3 parts by weight of potassium persulfate was added to the reactor batchwise, and the remaining amount of 1,3-butadiene was continuously added. When a polymerization conversion rate reached 70 to 80%, 0.3 parts by weight of a rosin acid saponifying agent was added batchwise. When a polymerization conversion rate reached 93%, polymerization was terminated to prepare conjugated diene rubber latex.

The average particle diameter of the prepared conjugated diene rubber latex was 3,000 Å, and the solids content thereof was 55 to 60% by weight.

<Preparation of Vinyl Cyanide Compound-Conjugated Diene Compound-Aromatic Vinyl Compound Graft Copolymer (Hereinafter Referred to as ABS Graft Copolymer)>

A mixed solution containing 10 parts by weight of acrylonitrile; 30 parts by weight of styrene; 25 parts by weight of deionized water; 0.12 parts by weight of t-butyl hydroperoxide; 0.9 parts by weight of potassium rosinate; and 0.35 parts by weight of tertiary dodecyl mercaptan, which had been mixed in a separate mixing apparatus, 0.054 parts by weight of dextrose, 0.004 parts by weight of sodium pyrrole phosphate, and 0.002 parts by weight of ferrous sulfate were added to a nitrogen-substituted polymerization reactor containing 60 parts by weight of the prepared conjugated diene rubber latex having a solids content of 55 to 60% by weight and 100 parts by weight of deionized water at 70° C. over 3 hours. Thereafter, 0.05 parts by weight of dextrose, 0.03 parts by weight of sodium pyrophosphate, 0.001 parts by weight of ferrous sulfate, and 0.05 parts by weight of t-butyl hydroperoxide were added to the polymerization reactor batchwise, and heating was performed so that temperature was increased to 80° C. over 1 hour. Then, the reaction was terminated to prepare ABS graft copolymer latex. At this time, a polymerization conversion rate was 97%.

Example 1

0.05 parts by weight of a nonionic polymer coagulant and 1.6 parts by weight of a cationic polymer coagulant were added to 100 parts by weight (based on solids) of the prepared ABS graft copolymer latex at 80° C., and coagulation and aging were performed for 30 minutes. The coagulated ABS graft copolymer was dehydrated and dried to prepare ABS graft copolymer powder. 27 parts by weight of the prepared ABS graft copolymer powder and 73 parts by weight of an acrylonitrile-styrene copolymer (LG Chemical Co., Ltd, 92HR) were added to a mixer and mixed. Then, melt kneading was performed at 210° C. using an extruder, and then pelletization was performed. Then, specimens for measuring physical properties were prepared using an injection molding machine.

Examples 2 to 4

Specimens for measuring physical properties were prepared in the same manner as in Example 1, except that the kinds and contents of the first and second coagulants were changed according to Table 1 below.

Comparative Example 1

2.0 parts by weight of a cationic polymer coagulant was added to 100 parts by weight (based on solids) of the prepared ABS graft copolymer latex at 80° C., and the temperature was increased to 93° C. over 30 minutes to coagulate the ABS graft copolymer latex. The coagulated ABS graft copolymer was dehydrated and dried to prepare ABS graft copolymer powder. 27 parts by weight of the prepared ABS graft copolymer powder and 73 parts by weight of an acrylonitrile-styrene copolymer (92HR, LG Chemical Co., Ltd) were added to a mixer and mixed. Then, melt kneading was performed at 210° C. using an extruder, and then pelletization was performed. Then, specimens for measuring physical properties were prepared using an injection molding machine.

Comparative Examples 2 to 7

Specimens for measuring physical properties were prepared in the same manner as in Comparative Example 1, except that the kinds and contents of the coagulants were changed according to Table 2 below.

Comparative Examples 8 to 15

Specimens for measuring physical properties were prepared in the same manner as in Example 1, except that the kinds and contents of the first and second coagulants were changed according to Tables 3 and 4 below.

Test Examples

The properties of the specimens prepared in Examples 1 to 4 and Comparative Examples 1 to 15 were measured according to the following methods, and the results are shown in Tables 1 to 4.

Measurement Methods

Coagulation state: After coagulation, slurry was washed and dried, and the resulting mother liquor was evaluated by the naked eye. When graft copolymer latex was completely coagulated, it was marked as "○". When non-coagulated graft copolymer latex was observed, it was marked as "X".

Gloss: Gloss was measured at 45° using a glossmeter according to ASTM D258.

b-value: b-values were measured using a Hunter lab colorimeter.

b-value measured after being left: after being left at 250° C. for 15 minutes in an injection molding machine, b-values were measured using a Hunter lab colorimeter.

Content of polymer coagulants (ppm): 0.3 g of a specimen was dissolved in chloroform, polymers were precipitated using methanol, supernatant was filtered, and the content of polymer coagulants was measured using LC/DAD Agilent 1290 LC-2 detectors (DAD and FLD as stand-alone instrument).

TABLE 1

| Classification | Example 1 | Example 2 | Example 3 | Example 4 |
|---|---|---|---|---|
| Content of first coagulant (parts by weight) | Non-ionic 0.05 | Non-ionic 0.25 | Non-ionic 0.05 | Non-ionic 0.25 |
| Content of second coagulant (parts by weight) | Cationic 1.6 | Cationic 0.5 | Anionic 3.3 | Anionic 0.75 |
| Sum of coagulants | 1.65 | 0.75 | 3.35 | 1.0 |
| Coagulation state | ○ | ○ | ○ | ○ |
| b-value | 4.8 | 4.8 | 4.9 | 4.6 |
| b-value measured after being left | 8.2 | 8.1 | 8.3 | 8.1 |
| Gloss | 85 | 93 | 80 | 88 |
| Content of polymer coagulants (ppm) | 1,650 | 730 | 3,300 | 3,300 |

TABLE 2

| Classification | Comparative Example 1 | Comparative Example 2 | Comparative Example 3 | Comparative Example 4 | Comparative Example 5 | Comparative Example 6 |
|---|---|---|---|---|---|---|
| Content of first coagulant (parts by weight) | Cationic 2.0 | Magnesium sulfate 2.0 | Sulfuric acid 2.0 | Anionic 5.0 | Non-ionic 5.0 | Cationic 1.5 |
| Content of second coagulant (parts by weight) | — | — | — | — | — | — |
| Sum of coagulants | 2.0 | 2.0 | 2.0 | 5.0 | 5.0 | 1.5 |
| Coagulation state | ○ | ○ | ○ | ○ | ○ | X |
| b-value | 4.6 | 3.2 | 5.5 | 4.4 | 4.4 | — |
| b-value measured after being left | 8.1 | 13 | 8.8 | 8.1 | 8.3 | — |
| Gloss | 78 | 103 | 90 | 71 | 72 | — |
| Content of polymer coagulants (ppm) | 18,000 | — | — | 49,000 | 48,000 | — |

TABLE 3

| Classification | Comparative Example 7 | Comparative Example 8 | Comparative Example 9 | Comparative Example 10 | Comparative Example 11 | Comparative Example 12 |
|---|---|---|---|---|---|---|
| Content of first coagulant (parts by weight) | Anionic 3.4 | Non-ionic 0.3 | Non-ionic 0.03 | Non-ionic 0.25 | Non-ionic 0.05 | Non-ionic 0.3 |
| Content of second coagulant (parts by weight) | — | Cationic 0.5 | Cationic 1.6 | Cationic 0.4 | Cationic 1.8 | Anionic 0.75 |
| Sum of coagulants | 3.4 | 0.8 | 1.36 | 0.65 | 1.85 | 1.05 |
| Coagulation state | X | ○ | X | X | ○ | ○ |
| b-value | — | 4.6 | — | — | 4.7 | 4.6 |
| b-value measured after being left | — | 8.2 | — | — | 8.3 | 8.3 |
| Gloss | — | 78 | — | — | 78 | 75 |
| Content of polymer coagulants (ppm) | — | 800 | — | — | 1,800 | 1,000 |

TABLE 4

| Classification | Comparative Example 13 | Comparative Example 14 | Comparative Example 15 |
|---|---|---|---|
| Content of first coagulant (parts by weight) | Non-ionic 0.03 | Non-ionic 0.25 | Non-ionic 0.05 |
| Content of second coagulant (parts by weight) | Anionic 3.3 | Anionic 0.65 | Anionic 3.4 |
| Sum of coagulants | 3.33 | 0.90 | 3.45 |
| Coagulation state | X | X | ○ |
| b-value | — | — | 4.6 |
| b-value measured after being left | — | — | 8.2 |
| Gloss | — | — | 74 |
| Content of polymer coagulants (ppm) | — | — | 1,000 |

As shown in Tables 1 to 4, in the case of Examples to 4 according to the present invention, coagulation efficiency is excellent, gloss increases, a b-value measured using a Hunter lab colorimeter and a b-value measured after being left are small, indicating that color properties are excellent.

On the other hand, in the case of Comparative Example 1 in which a cationic polymer coagulant is used alone in an amount of 2.0 parts by weight, gloss decreases, and an excess of polymer coagulants is included in a resin composition. In this case, the surface of a final product may be defective. In the case of Comparative Example 6 in which a cationic polymer coagulant is used in an amount of 1.5 parts by weight, coagulation does not proceed.

In addition, in the case of Comparative Example 4 in which an anionic polymer coagulant is used alone in an amount of 5.0 parts by weight, gloss decreases. In the case of Comparative Example 7 in which an anionic polymer coagulant is used in an amount of 3.4 parts by weight, coagulation does not proceed. In the case of Comparative Example 5 in which a nonionic polymer coagulant is used alone in an amount of 5.0 parts by weight, gloss decreases.

In addition, in the case of Comparative Examples 2 and 3 in which a conventional salt coagulant or acid coagulant is used, the results for a b-value measured after being left or a b-value are not good.

In addition, in the case of Comparative Examples 8 to 15 in which a first coagulant and a second coagulant are used, but a content range used is outside the content range of the present invention, coagulation does not proceed, or although coagulation proceeds, gloss decreases, and results for a b-value or a b-value measured after being left are not good.

The invention claimed is:

1. A method of preparing a vinyl cyanide compound-conjugated diene compound-aromatic vinyl compound graft copolymer, the method comprising:
preparing graft copolymer latex by graft-polymerizing 20 to 40% by weight of an aromatic vinyl compound and 1 to 20% by weight of a vinyl cyanide compound onto 50 to 70% by weight of conjugated diene rubber latex having a solids content of 30 to 65% by weight; and
coagulating and aging the prepared graft copolymer latex by adding 0.04 to 0.27 parts by weight of a nonionic polymer coagulant as a first coagulant, and 0.47 to 1.65 parts by weight of a cationic polymer coagulant or 0.73 to 3.35 parts by weight of an anionic polymer coagulant as a second coagulant to 100 parts by weight (based on solids) of the prepared graft copolymer latex,
wherein, when the second coagulant is the cationic polymer coagulant, a total weight of the nonionic polymer coagulant and the cationic polymer coagulant is 0.7 to 1.7 parts by weight, and when the second coagulant is the anionic polymer coagulant, a total weight of the nonionic polymer coagulant and the anionic polymer coagulant is 0.97 to 3.37 parts by weight.

2. The method according to claim 1, wherein the cationic polymer coagulant comprises an amino group, an ammonium group, or both at a terminus thereof, and the anionic polymer coagulant comprises an amide group, a carboxylate group, or both at a terminus thereof.

3. The method according to claim 1, wherein the nonionic polymer coagulant, cationic polymer coagulant and anionic polymer coagulant are is prepared in a form of an emulsion.

4. The method according to claim 1, wherein, in the coagulating and aging, the first polymer coagulant and the second polymer coagulant are added at 75 to 90° C.

5. The method according to claim 1, wherein, in the coagulating and aging, coagulating and aging are performed for 5 to 100 minutes after adding the first and second coagulants.

6. The method according to claim 1, wherein, in the preparing of the graft copolymer latex, 70 to 200 parts by weight of deionized water, 0.1 to 2 parts by weight of an initiator, 0.1 to 2 parts by weight of an emulsifier, and 0.05 to 1.5 parts by weight of a molecular weight modifier are added to 100 parts by weight in total of the conjugated diene rubber latex, the aromatic vinyl compound, and the vinyl cyanide compound to perform polymerization, and then the polymerization reaction is terminated at a polymerization conversion rate of 93 to 99% by weight.

7. The method according to claim 1, wherein the preparing of the graft copolymer latex comprises preparing the conjugated diene rubber latex by adding 30 to 100 parts by weight of deionized water, 0.5 to 3 parts by weight of an emulsifier, 0.01 to 0.5 parts by weight of an electrolyte, 0.1 to 0.5 parts by weight of a molecular weight modifier, and 0.1 to 1 part by weight of an initiator to 100 parts by weight of a conjugated diene compound and performing polymerization.

8. The method according to claim 1, comprising, after the coagulating and aging, performing dehydration and drying.

9. A vinyl cyanide compound-conjugated diene compound-aromatic vinyl compound graft copolymer prepared using the method according to any one of claims 1 to 8.

10. A thermoplastic resin composition, comprising 20 to 40% by weight of the vinyl cyanide compound-conjugated diene compound-aromatic vinyl compound graft copolymer of claim 9 and 60 to 80% by weight of an aromatic vinyl compound-vinyl cyanide compound copolymer.

11. The thermoplastic resin composition according to claim 10, wherein, when gloss is measured at 45° using a glossmeter according to ASTM D258, the thermoplastic resin composition has a gloss of 80 or more.

12. The thermoplastic resin composition according to claim 10, wherein the thermoplastic resin composition has a b-value of 4.9 or less as measured using a colorimeter and a b-value of 8.3 or less as measured after being left at 250° C. for 15 minutes.

13. The thermoplastic resin composition according to claim 10, wherein, when 0.3 g of the thermoplastic resin composition is dissolved in chloroform, polymers are precipitated using methanol, supernatant is filtered, and a content of polymer coagulants is measured using LC/DAD detectors, the content of the polymer coagulants in the thermoplastic resin composition is 4,000 ppm or less.

* * * * *